(12) United States Patent
Muhlbach et al.

(10) Patent No.: US 8,424,403 B2
(45) Date of Patent: Apr. 23, 2013

(54) MULTI-GEAR POWERSHIFT TRANSMISSION

(75) Inventors: Vladimir Muhlbach, Reichenau (DE); Robert Morrison, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 286 days.

(21) Appl. No.: 12/991,211

(22) PCT Filed: Mar. 23, 2009

(86) PCT No.: PCT/EP2009/053354
§ 371 (c)(1),
(2), (4) Date: Nov. 5, 2010

(87) PCT Pub. No.: WO2009/144050
PCT Pub. Date: Dec. 3, 2009

(65) Prior Publication Data
US 2011/0056330 A1    Mar. 10, 2011

(30) Foreign Application Priority Data
May 29, 2008    (DE) .................. 10 2008 002 069

(51) Int. Cl.
*F16H 3/08*    (2006.01)
(52) U.S. Cl.
USPC ............................................. 74/331; 74/665
(58) Field of Classification Search .................... 74/331, 74/665
See application file for complete search history.

(56) References Cited

U.S. PATENT DOCUMENTS

| | | | |
|---|---|---|---|
| 3,858,455 A | 1/1975 | Sisson et al. | |
| 5,249,475 A | 10/1993 | McAskill | |
| 5,819,587 A * | 10/1998 | Leber et al. | 74/331 |
| 6,095,001 A * | 8/2000 | Ruehle et al. | 74/331 |
| 7,421,920 B2 | 9/2008 | Regenscheit | |
| 7,454,991 B2 | 11/2008 | Buck et al. | |
| 2003/0015050 A1* | 1/2003 | Huber et al. | 74/331 |
| 2003/0131686 A1* | 7/2003 | Huber | 74/664 |
| 2003/0136209 A1* | 7/2003 | Huber | 74/331 |
| 2011/0056330 A1* | 3/2011 | Muhlbach et al. | 74/655 |

FOREIGN PATENT DOCUMENTS

| | | |
|---|---|---|
| DE | 1 053 326 | 3/1959 |
| DE | 103 30 157 A1 | 2/2005 |
| WO | 2005/071286 A1 | 8/2005 |

* cited by examiner

*Primary Examiner* — Troy Chambers
*Assistant Examiner* — Alexander Vu
(74) *Attorney, Agent, or Firm* — Davis & Bujold, PLLC

(57) ABSTRACT

A multi-gear powershift transmission for a working machine, in particular a forklift truck, which has a driveshaft (2) driven by a torque converter (1) such that, by way of fixed wheels (8, 13, 18, 23), loose wheels (10, 15, 20, 27) and shift clutches (4, 9, 19) arranged on countershafts (7, 12, 22) in a first transmission, at least two forward gears and two reverse gears can be engaged. The powershift transmission can be supplemented with a further countershaft (24) having a fixed wheel (25), a clutch (26) and a loose wheel (27) in order to produce a second powershift transmission in which three gears in the forward driving direction and three gears in the reverse driving direction are engageable.

20 Claims, 2 Drawing Sheets

MULTI-GEAR POWERSHIFT TRANSMISSION

This application is a National Stage completion of PCT/EP2009/053354 filed Mar. 23, 2009, which claims priority from German patent application serial no. 10 2008 002 069.9 filed May 29, 2008.

FIELD OF THE INVENTION

The invention concerns a multi-gear powershift transmission.

BACKGROUND OF THE INVENTION

Multi-gear powershift transmissions, in particular for forklift trucks, are often required to have two gears for driving forward and two gears for driving in reverse, or three gears for forward driving and three gears for reversing, depending on their intended purpose.

DE 103 30 157 A1 discloses a multi-gear powershift transmission for building machines, in particular for excavators and tele-handlers, which has four forward and two reverse gears.

SUMMARY OF THE INVENTION

The purpose of the present invention is to provide a powershift transmission, in particular for forklift trucks, which in a simple manner can be made as a transmission with two forward and two reverse gears or with three forward and three reverse gears.

By virtue of the structure of the powershift transmission according to the invention with two forward and two reverse gears and three forward and three reverse gears, it is possible by adding a single clutch with an associated countershaft and a fixed and a loose wheel, to create from the powershift transmission with two forward and two reverse gears a powershift transmission with three forward and three reverse gears.

In the case of the powershift transmission with two forward and two reverse gears a drive motor, for example an internal combustion engine, drives a driveshaft via a hydrodynamic torque converter. The driveshaft is connected in a rotationally fixed manner to a fixed wheel which, together with a clutch, a loose wheel and the driveshaft, forms a forward-gear unit. A fixed wheel, a clutch and a loose wheel as well as a countershaft form a reverse-gear unit, and the fixed wheel of the reverse-gear unit meshes with the fixed wheel of the forward-gear unit. A further countershaft, a fixed wheel, a clutch and a loose wheel form the first gear-unit and the fixed wheel of this first gear-unit meshes with the loose wheel of the reverse-gear unit and with the loose wheel of the forward-gear unit. A drive output shaft, a fixed wheel, a clutch and a loose wheel form the second gear-unit and the loose wheel of this second gear-unit meshes with the fixed wheel of the first gear-unit and the fixed wheel of the second gear-unit meshes with the loose wheel of the first gear-unit. This makes it possible to provide a very compact powershift transmission with two forward and two reverse gears. To form from the powershift transmission with the two forward and two reverse gears a powershift transmission with three forward and three reverse gears, the countershaft of the second gear-unit is additionally connected in a rotationally fixed manner to a second fixed wheel and the transmission is extended by a third gear-unit consisting of a loose wheel, a countershaft, a clutch and a fixed wheel. The fixed wheel of the third gear-unit meshes with the loose wheel of the second gear-unit and the second fixed wheel of the second gear-unit meshes with the loose wheel of the third gear-unit. The countershaft of the second gear-unit can be used as a drive output shaft, but to form an axle offset it is also possible for the first fixed wheel of the second gear-unit to be brought into active connection with a fixed wheel held rotationally fixed on a drive output shaft, whereby there will be an axial separation between the drive output shaft and the countershaft of the second gear-unit.

BRIEF DESCRIPTION OF THE DRAWINGS

Other features emerge from the description of the figures, which show.

DETAILED DESCRIPTION OF THE PREFERRED EMBODIMENTS

Figure 1:
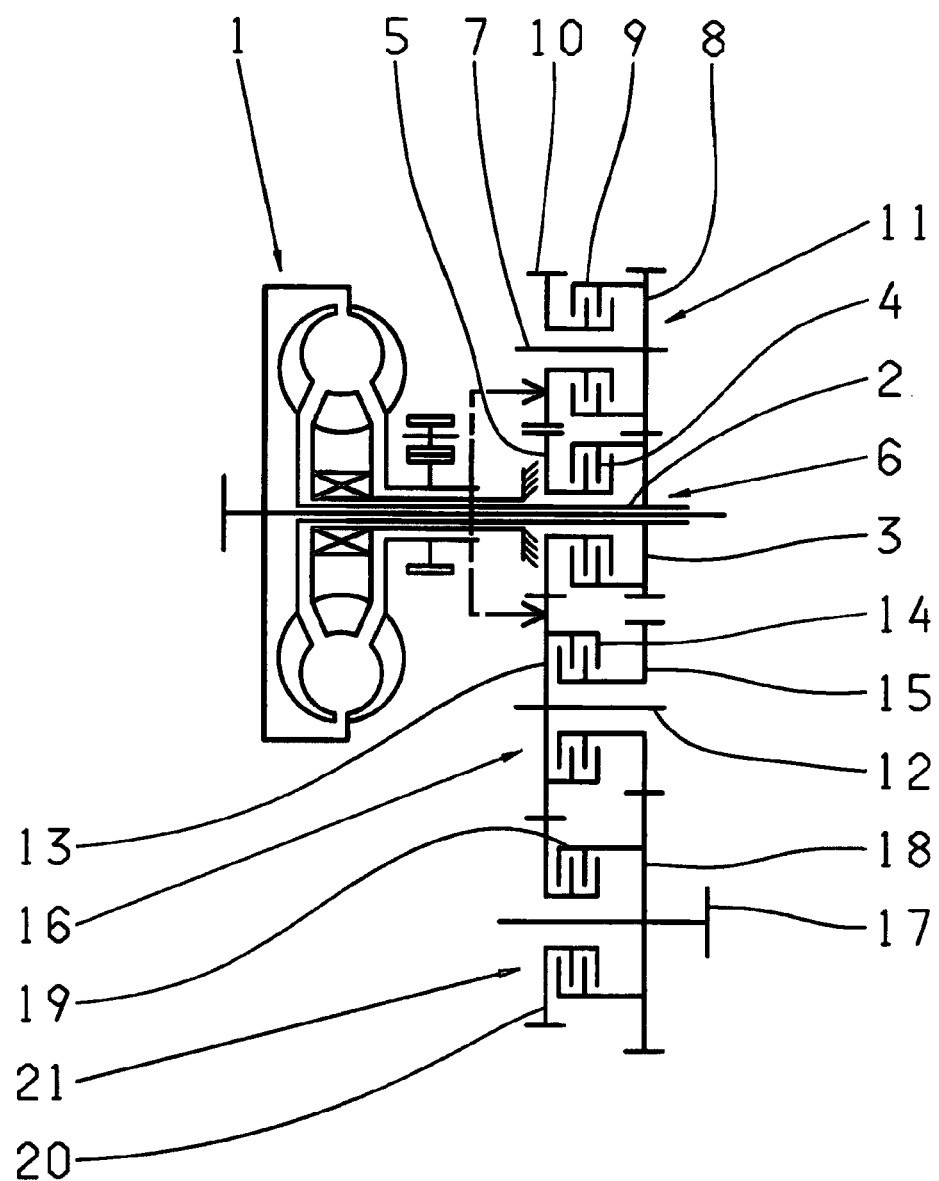
FIG. 1: Transmission layout of a powershift transmission with two forward and two reverse gears.
Figure 2:
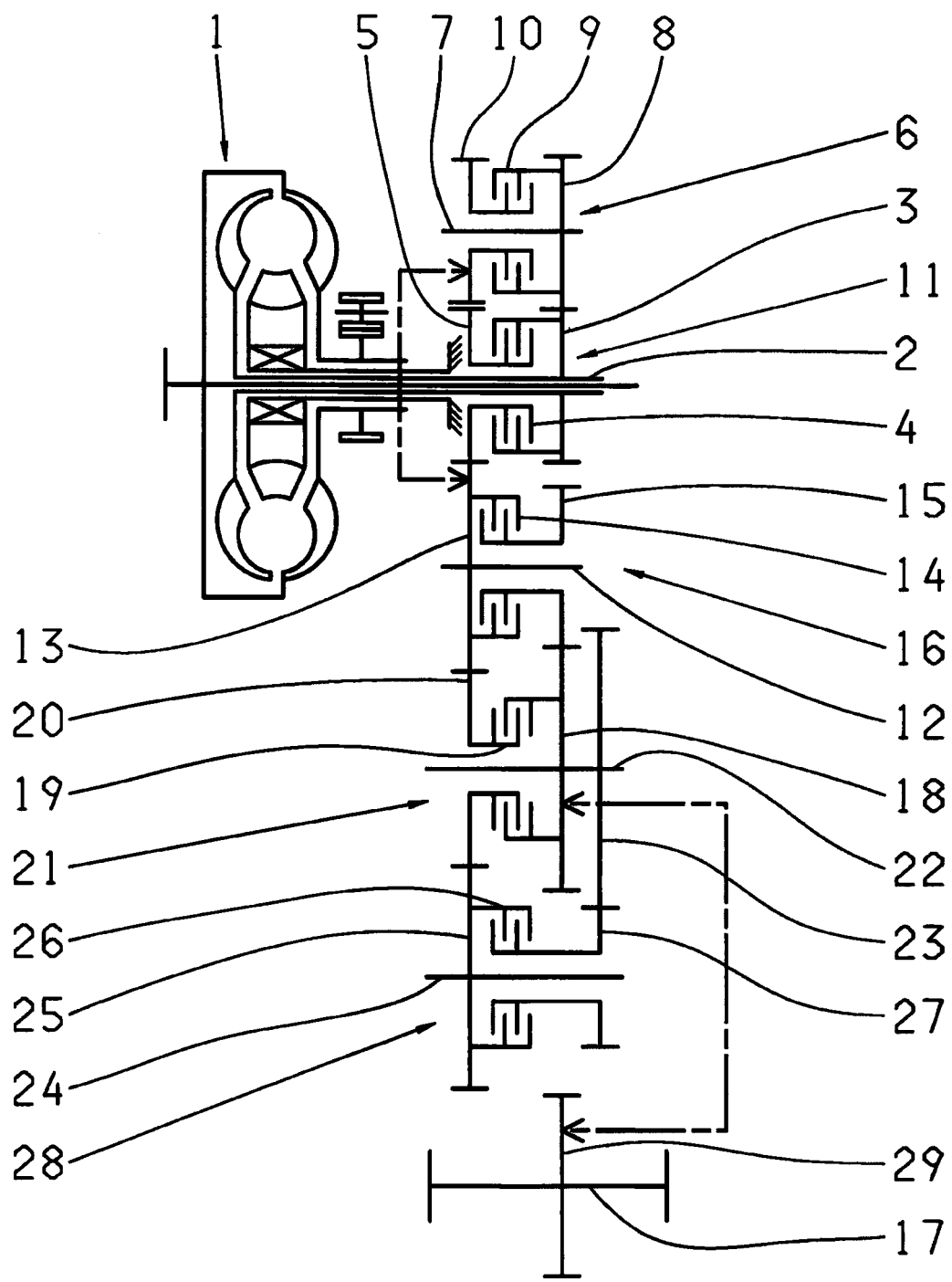
FIG. 2: Transmission layout of a powershift transmission with three forward and three reverse gears.

FIG. 1:

A hydrodynamic torque converter 1 drives a fixed wheel 3 via a driveshaft 2. The fixed wheel 3 can be connected in a rotationally fixed manner to a loose wheel 5 by a clutch 4. The driveshaft 2, fixed wheel 3, clutch 4 and loose wheel 5 form the forward-gear unit 6. A countershaft 7, a fixed wheel 8, a clutch 9 and a loose wheel 10 form the reverse-gear unit 11. The fixed wheel 8 meshes with the fixed wheel 3. A further countershaft 12, a fixed wheel 13, a clutch 14 and a loose wheel 15 form the first gear-unit 16. The drive output shaft 17, fixed wheel 18, clutch 19 and loose wheel 20 form the second gear-unit 21. The fixed wheel 13 meshes with the loose wheel 20, the loose wheel 10 and the loose wheel 5.

To engage the first gear in the forward driving direction, the clutches 4 and 14 are actuated in the engaging direction and the clutches 9 and 19 in the disengaging direction. To engage the second forward driving gear the clutch 4 remains actuated in the engaging direction and the clutch 9 remains actuated in the disengaging direction, whereas the clutch 19 is actuated in its engaging direction and the clutch 14 in its disengaging direction. To engage a first gear in a reverse driving direction the clutch 9 is actuated in its engaging direction and the clutch 4 in its disengaging direction, and the clutch 14 is actuated in its engaging direction and the clutch 19 in its disengaging direction.

FIG. 2:

A hydrodynamic torque converter 1 drives the driveshaft 2. Connected in a rotationally fixed manner to the driveshaft 2 is a fixed wheel 3, which is arranged coaxially with a loose wheel 5. The driveshaft 2, fixed wheel 3, loose wheel 5 and the clutch 4 form the reverse-gear unit 11. The countershaft 7, fixed wheel 8, clutch 9 and loose wheel 10 form the forward-gear unit 6. The further countershaft 12, fixed wheel 13, clutch 14 and loose wheel 15 form the first gear-unit 16. The countershaft 22, fixed wheel 18, clutch 19, loose wheel 20 and the second fixed wheel 23 form the second gear-unit 21. The countershaft 24, fixed wheel 25, clutch 26 and loose wheel 27 form a third gear-unit 28. The drive output shaft 17 is connected in a rotationally fixed manner to the fixed wheel 29. The fixed wheel 20 meshes on one side with the fixed wheel 25 and the fixed wheel 13. The fixed wheel 13 meshes with the loose wheel 10 and the loose wheel 5. The fixed wheel 18 meshes with the loose wheel 15 and the fixed wheel 29. The second fixed wheel 23 meshes with the loose wheel 27.

To engage the first gear in the forward driving direction, the clutches 9 and 26 are actuated in the engaging direction and the clutches 19, 14 in the disengaging direction. To engage the second gear in the forward driving direction, the clutches 9 and 14 are actuated in the engaging direction and the clutches 4, 19 and 26 in the disengaging direction. To engage the third forward driving gear, the clutches 9 and 19 are actuated in the engaging direction and the clutches 26, 14 and 4 in the disengaging direction. To engage the first gear in the reverse driving direction, the clutches 4 and 26 are actuated in the engaging direction and the clutches 9, 14 and 19 in the disengaging direction. To engage the second reverse gear, the clutches 4 and 14 are actuated in the engaging direction and the clutches 9, 19 and 26 in the disengaging direction. To engage the third reverse gear, the clutches 4 and 19 are actuated in the engaging direction and the clutches 9, 14 and 26 in the disengaging direction.

It is also possible to use the countershaft 22 as a drive output shaft, and the drive output shaft 17 and fixed wheel 29 can then be omitted. This gives the possibility, exclusively by using one further fixed wheel 23, the countershaft 24, the fixed wheel 25, the clutch 26 and the loose wheel 27, of producing from the powershift transmission with two forward and two reverse gears, a powershift transmission with three gears in the forward driving direction and three gears in the reverse driving direction.

INDEXES

1 Hydrodynamic torque converter
2 Driveshaft
3 Fixed wheel
4 Clutch
5 Loose wheel
6 Forward-gear unit
7 Countershaft
8 Fixed wheel
9 Clutch
10 Loose wheel
11 Reverse-gear unit
12 Further countershaft
13 Fixed wheel
14 Clutch
15 Loose wheel
16 First gear-unit
17 Drive output shaft
18 Fixed wheel
19 Clutch
20 Loose wheel
21 Second gear-unit
22 Countershaft
23 Second fixed wheel
24 Countershaft
25 Fixed wheel
26 Clutch
27 Loose wheel
28 Third gear-unit
29 Fixed wheel

The invention claimed is:
1. A multi-gear powershift transmission for a working machine with three forward gears and three reverse gears, the powershift transmission comprising:
 a torque converter (1),
 a driveshaft (2),
 a drive output shaft (17);
 first, second, third and fourth countershafts (7, 12, 22, 24);
 first, second, third, fourth and fifth loose wheels (5, 10, 15, 20, 27);
 first, second, third, fourth, fifth, sixth and seventh fixed wheels (3, 8, 13, 18, 23, 25, 29); and
 reverse, forward, first, second and third clutches (4, 9, 14, 19, 26);
 wherein the first fixed wheel (3) is fixedly connected to the driveshaft (2) and the first fixed wheel (3) meshes with the second fixed wheel (8) of a forward-gear unit (6) which comprises the second fixed wheel (8), the forward clutch (9) and the second loose wheel (10),
 the first fixed wheel (3), the reverse clutch (4) and the first loose wheel (5) are arranged coaxially with the driveshaft (2) and together form a reverse-gear unit (11),
 the third fixed wheel (13) is fixedly connected to the second countershaft (12) and the third fixed wheel (13) meshes with the first loose wheel (5) arranged coaxially with the first fixed wheel (3) of the driveshaft (2) and with the second loose wheel (10) of the forward-gear unit (6),
 the third fixed wheel (13), the first clutch (14) and the third loose wheel (15) are arranged coaxially with the third fixed wheel (13) and together form a first gear-unit (16),
 the fourth fixed wheel (18) is fixedly connected to the third countershaft (22) and the fourth fixed wheel (18) meshes with the third loose wheel (15) of the first gear-unit (16), and the fourth fixed wheel (18) together with the fifth fixed wheel (23), the second clutch (19) and the fourth loose wheel (20) are all arranged coaxially with the third countershaft (22) and form a second gear-unit (21),
 the fourth loose wheel (20) of the second gear-unit (21) meshes with the third fixed wheel (13) of the first gear-unit (16), and the fifth fixed wheel (23) of the second gear-unit (21) meshes with the fifth loose wheel (27) of a third gear-unit (28), and the fourth loose wheel (20) of the second gear-unit (21) meshes with the sixth fixed wheel (25) of the third gear-unit (28), and the fifth loose wheel (27), the third clutch (26), the sixth fixed wheel (25) and the fourth countershaft (24) together form the third gear-unit (28), and
 the seventh fixed wheel (29) is fixedly connected to the drive output shaft (17), and the seventh fixed wheel (29) meshes with the fourth fixed wheel (18) of the second gear-unit (21).

2. The multi-gear powershift transmission according to claim 1, wherein the first fixed wheel (3) of the reverse-gear unit (11) is connectable, by the reverse clutch (4) of the reverse-gear unit (11), to the first loose wheel (5) of the reverse-gear unit (11); by the forward clutch (9) of the forward gear-unit (6), the second fixed wheel (8) of the forward-gear unit (6) is connectable to the second loose wheel (10) of the forward-gear unit (6); by the first clutch (14) of the first gear-unit (16), the third fixed wheel (13) of the first gear-unit (16) is connectable to the third loose wheel (15) of the first gear-unit (16); by the second clutch (19) of the second gear-unit (21), the fourth and the fifth fixed wheels (18, 23) of the second gear-unit (21) are connectable to the fourth loose wheel (20) of the second gear-unit (21); and by the third clutch (26) of the third gear-unit (28), the sixth fixed wheel (25) of the third gear-unit (28) is connectable to the fifth loose wheel (27) of the third gear-unit (28).

3. The multi-gear powershift transmission according to claim 2, wherein a first gear in a forward driving direction is engaged by engagement of the forward clutch (9) of the forward-gear unit (6) and the third clutch (26) of the third gear-unit (28), and disengagement of the reverse clutch (4) of the reverse-gear unit (11) and the first and the second clutches.

4. The multi-gear powershift transmission according to claim 2, wherein a second gear in a forward driving direction is engaged by engagement of the forward clutch (9) of the forward-gear unit (6) and the first clutch (14) of the first gear-unit (16), and disengagement of the reverse, the second and the third clutches.

5. The multi-gear powershift transmission according to claim 2, wherein a third gear in a forward driving direction is engaged by engagement of the forward clutch (9) of the forward-gear unit (6) and the second clutch (19) of the second gear-unit, and disengagement of the reverse, the first and the third clutches.

6. The multi-gear powershift transmission according to claim 2, wherein a first gear in a reverse driving direction is engaged by engagement of the reverse clutch (4) of the reverse-gear unit (11) and the third clutch (26) of the third gear-unit. (28), and disengagement of the forward, the first and the second clutches.

7. The multi-gear powershift transmission according to claim 2, wherein a third gear in a reverse driving direction is engaged by engagement of the reverse clutch (4) of the reverse-gear unit (11) and the second clutch (19) of the second gear-unit (21), and disengagement of the forward, the first and the third clutches.

8. The multi-gear powershift transmission according to claim 2, wherein a first gear in a forward driving direction is engaged by engagement of the forward clutch (9) of the forward-gear unit (6) and the third clutch (26) of the third gear-unit (28), and disengagement of the reverse clutch (4) of the reverse-gear unit (11) and the first and the second clutches;
 a second gear in a forward driving direction is engaged by engagement of the forward clutch (9) of the forward-gear unit (6) and the first clutch (14) of the first gear-unit (16), and disengagement of the reverse, the second and the third clutches; and
 a third gear in a forward driving direction is engaged by engagement of the forward clutch (9) of the forward-gear unit (6) and the second clutch (19) of the second gear-unit, and disengagement of the reverse, the first and the third clutches.

9. The multi-gear powershift transmission according to claim 8, wherein a first gear in a reverse driving direction is engaged by engagement of the reverse clutch (4) of the reverse-gear unit (11) and the third clutch (26) of the third gear-unit (28), and disengagement of the forward, the first and the second clutches.

10. The multi-gear powershift transmission according to claim 1 wherein the torque converter (1) directly drives the drive shaft (2).

11. The multi-gear powershift transmission according to claim 1 wherein the drives shaft (2) is hollow and the multi-gear powershift transmission comprises only a single hollow drive shaft.

12. The multi-gear powershift transmission according to claim 1 wherein the fixed wheel (3) only meshes with the fixed wheel (8) of the forward-gear unit (6).

13. A multi-gear powershift transmission for working machines, in particular for lifting trucks, comprising:
 a torque converter;
 a drive input shaft;
 a drive output shaft;
 a plurality of countershafts;
 a plurality of loose gears, a plurality of fixed gears and a plurality of shift clutches distributed on the input, the output and the countershafts so as to form three forward gears and three reverse gears;
 the drive input shaft is rotationally conjointly connected to a fixed gear of the drive input shaft which meshes with a fixed gear of a forward gear unit;
 the forward gear unit comprises the fixed gear of the forward gear unit, a clutch of the forward gear unit and a loose gear of the forward gear unit;
 a reverse gear unit comprises the fixed gear of the drive input shaft, a clutch of the reverse gear unit and a loose gear of the reverse gear unit which all arranged coaxially with the drive input shaft;
 a first further countershaft is rotationally conjointly connected to a fixed gear of the first further countershaft, which meshes with the loose gear of the reverse gear unit and also meshes with the loose gear of the forward gear unit;
 a first gear unit comprises the fixed gear of the first further countershaft, a clutch of the first gear unit and a loose gear of the first gear unit which are all arranged coaxially with the first further countershaft;
 a second further countershaft is rotationally conjointly connected to a first fixed gear of the second further countershaft which meshes with the loose gear of the first gear unit;
 a second gear unit comprises the first fixed gear of the second further countershaft, a second fixed gear of the second further countershaft, a clutch of second gear unit and a loose gear second gear unit;
 the clutch of the second gear unit and the loose gear of the second gear unit are arranged coaxially with the first fixed gear of the second further countershaft and with the second fixed gear of the second further countershaft;
 the loose gear of the second gear unit meshes with the fixed gear of the first further countershaft;
 the second fixed gear of the second further countershaft meshes with a loose gear of a third gear unit;
 the loose gear of the second gear unit meshes with a fixed gear of the third gear unit;
 the loose gear of the third gear unit, a clutch of the third gear unit, the fixed gear of the third gear unit and a third further countershaft all form the third gear unit; and
 the drive output shaft is rotationally conjointly connected to a fixed gear of the drive output shaft which meshes with the first fixed gear of the second gear unit.

14. The multi-gear powershift transmission according to claim 13, wherein the fixed gear (3) of the drive input shaft (2) is connectable to the loose gear (5) of the reverse gear unit (11) by the clutch (4) of the reverse gear unit (11);
 the fixed gear (8) of the forward gear unit (6) is connectable to the loose gear (10) of the forward gear unit (6) by the clutch (9) of the forward gear unit (6);
 the fixed gear (13) of the first further countershaft (12) is connectable to the loose gear (15) of the first gear unit (16) by the clutch (14) of the first gear unit (16);
 the first and the second fixed gears (18, 23) of the second further countershaft (22) is connectable to the loose gear (20) of the second gear unit (21) by the clutch (19) of the second gear unit (21); and
 the fixed gear (25) of the third gear unit (28) is connectable to the loose gear (27) of the third gear unit (28) by the clutch of the third gear unit (28).

15. The multi-gear powershift transmission according to claim 14, wherein a first forward gear is engaged by engaging the clutch (9) of the forward gear unit (6) and the clutch (26) of the third gear unit (28) and disengaging the clutch (4) of the reverse gear unit (11), the clutch (14) of the first gear unit and the clutch (19) of the second gear unit (21).

16. The multi-gear powershift transmission according to claim 15, wherein a third reverse gear is engaged by engaging the clutch (4) of the reverse gear unit (11) and the clutch (19) of the second gear unit (21) and disengaging the clutch (14) of the first gear unit and the clutch (26) of the third gear unit (28).

17. The multi-gear powershift transmission according to claim 14, wherein a second forward gear is engaged by engaging the clutch (9) of the forward gear unit (6) and the clutch (14) of the first gear unit (16) and disengaging the clutch (19) of the second gear unit (21) and the clutch (26) of the third gear unit (28).

18. The multi-gear powershift transmission according to claim 14, wherein a third forward gear is engaged by engaging the clutch (9) of the forward gear unit (6) and the clutch (19) of the second gear unit (21) and disengaging the clutch (14) of the first gear unit and the clutch (26) of the third gear unit (28).

19. The multi-gear powershift transmission according to claim 18, wherein a first reverse gear is engaged by engaging the clutch (4) of the reverse gear unit (11) and the clutch (26) of the third gear unit (28) and disengaging the clutch (14) of the first gear unit and the clutch (19) of the second gear unit (21).

20. A multi-gear powershift transmission for a working machine having three forward and three reverse drive gears and comprises a torque converter (1), a driveshaft (2), a drive output shaft (17) and a plurality of countershafts (7, 12, 22, 24), with loose wheels (5, 10, 2, 20, 27), fixed wheels (3, 8, 13, 18, 23, 25, 29) and shift clutches (4, 9, 14, 19, 26) distributed on the driveshaft (2), the drive output shaft (17) and the plurality of countershafts (7, 12, 22, 24), wherein the driveshaft (2) is connected in a rotationally fixed manner to a fixed wheel (3) of the driveshaft (2) which meshes with a fixed wheel (8) of a forward-gear unit (6), the forward-gear unit (6) comprises the fixed wheel (8) of the forward-gear unit (6), a clutch (9) of the forward-gear unit (6) and a loose wheel (10) of the forward-gear unit (6), the fixed wheel (3) of the driveshaft (2) along with a clutch (4) of a reverse-gear unit (11) and a loose wheel (5) of the reverse-gear unit (11) are all arranged coaxially with the driveshaft (2) and together form the reverse-gear unit (11), a first further countershaft (12) is connected in a rotationally fixed manner to a fixed wheel (13) of the first further countershaft (12), the fixed wheel (13) meshes with the loose wheel (5) of the reverse-gear unit (11) and with the loose wheel (10) of the forward-gear unit (6), the fixed wheel (13) of the first further countershaft (12) along with a clutch (14) of a first gear-unit (16) and a loose wheel (15) of the first gear-unit (16), are all arranged coaxially with the first further countershaft (12) and together form the first gear-unit (16), and a second further countershaft (22) is connected in a rotationally fixed manner to a first fixed wheel (18), of the second further countershaft (22), which meshes with the loose wheel (2) of the first gear-unit (16), and the fixed wheel (18) of the second further countershaft (22) along with a second fixed wheel (23) of the second further countershaft (22), a clutch (19) of a second gear-unit (21) and a loose wheel (20) of the second gear-unit (21) are all arranged coaxially with the second fixed wheel (23) of the second further countershaft (22) form together form a second gear-unit (21), such that the loose wheel of the second gear-unit (21) meshes with the fixed wheel (13) of the first further countershaft (12), and the second fixed wheel (23) of the second further countershaft (22) meshes with a loose wheel (27) of a third gear-unit (28), and the loose wheel (20) of the second gear-unit (21) meshes with a fixed wheel (25) of the third gear-unit (28), and the loose wheel (27) of the third gear-unit (28), a clutch (26) of the third gear-unit (28), the fixed wheel (25) of the third gear-unit (28) and a third further countershaft (24) all together form the third gear-unit (28), and the drive output shaft (17) is connected, in a rotationally fixed manner, to a fixed wheel (29) of the drive output shaft (17), the fixed wheel (29) of the drive output shaft (17) meshes with the fixed wheel (18) of the second gear-unit (21).

* * * * *